United States Patent [19]

Miyzawa

[11] Patent Number: 4,893,038
[45] Date of Patent: Jan. 9, 1989

[54] DEVICE FOR LIMITING DIRECTION OF ROTATION OF SYNCHRONOUS MOTOR

[75] Inventor: Yukimori Miyzawa, Nagano, Japan

[73] Assignee: Kabushiki Kaisha Sankyo Seiki Seisakusho, Nagano, Japan

[21] Appl. No.: 321,126

[22] Filed: Mar. 9, 1989

[30] Foreign Application Priority Data

Mar. 10, 1988 [JP] Japan .............................. 63-32016[U]

[51] Int. Cl.4 ........................ H02K 7/10; H02K 19/00; F16D 63/00; F16H 57/10
[52] U.S. Cl. ........................................ 310/83; 310/41; 310/162; 188/82.1; 74/411.5
[58] Field of Search .................... 310/83, 162, 40 MM, 310/41, 76, 77, 163, 164; 188/82.1; 74/411.5, 421 A

[56] References Cited

FOREIGN PATENT DOCUMENTS 61-38863  3/1986  Japan .
61-41369  3/1986  Japan .
863241   11/1986  Rep. of Korea .

Primary Examiner—Patrick R. Salce
Assistant Examiner—C. La Balle
Attorney, Agent, or Firm—Sughrue, Mion, Zinn, Macpeak & Seas

[57] ABSTRACT

A device for limiting the direction of rotation of a synchronous motor includes a gear connectable to a rotor of the motor for being rotated. A shaft rotatably supports the gear in such a manner that the gear is movable along the axis of the shaft. A pair of fixed members are fixed to a casing and support the shaft. The gear is interposed between the pair of fixed members, and one of the fixed members has a first engaging portion on a surface thereof facing the gear. A first projection is integrally formed on a surface of the gear facing the one fixed member, the projection being engageable with the engaging portion when the gear is rotated. The projection is engageable with the engaging portion to move the gear along the axis of the shaft to allow the rotation of the gear when the rotor is rotated in a normal direction. The projection is brought into abutting engagement with the engaging portion to prevent the rotation of the gear when the rotor is rotated in a reverse direction. This abutting engagement causes the gear in the opposite direction due to a reaction force so that the rotor is caused to rotate in its normal direction.

13 Claims, 4 Drawing Sheets

DEVICE FOR LIMITING DIRECTION OF ROTATION OF SYNCHRONOUS MOTOR

BACKGROUND OF THE INVENTION

1. Field of the Invention

This invention relates to a device for limiting the direction of rotation of a synchronous motor to rotate the same in one direction.

2. Prior Art

The direction of rotation of a synchronous motor is not predetermined because of its electrical characteristics. Therefore, a device or mechanism for limiting the rotational direction of the sychronous motor is required in those applications in which a rotational direction of the motor is preset.

Japanese Laid-Open (Kokai) Utility Model Application Nos. 38863/86 and 41369/86 discloses such rotational direction-limiting mechanisms in which a reverse rotation-preventing lever is rotatably mounted on and frictionally engaged with a shaft of a first gear of a gear train, connected to an output shaft of a synchronous motor, so that this lever is rotatable about the axis of the first gear, the first gear being in mesh with a rotor shaft. A friction torque is applied between the lever and the first gear by means of either a viscous resistance produced by a grease or spring-biased contact. When the rotor is rotated in a reverse direction, the distal end of the reverse rotation-preventing lever is brought into striking engagement with an abutment surface, formed on the rotor, thereby to prevent a reverse rotation of the rotor and to urge the rotor to rotate in its normal direction by a reaction force produced upon engagement of the lever with the abutment surface.

With this conventional arrangement, however, depending on the strength of the transmitting force by the viscous resistance of the grease or the spring bias, the reverse rotation-preventing lever sometimes fails to properly rotate with the first gear, so that the distal end of this lever is not properly engaged with the abutment surface, thus failing to prevent the reverse rotation. Further, even if the rotor is successfully controlled to rotate in its normal direction, the friction torque between the first gear and the reverse rotation-preventing lever always constitute a load on the part of the small synchronous motor, so that the motor torque is not efficiently used.

Korean Utility Model Publication No. 86-3241 discloses another rotational direction-limiting mechanism in which a leaf spring is brought into abutting engagement with a projection, formed on a first gear of a gear train, when the rotor is rotated in a reverse direction thereby to prevent the reverse rotation and also to urge the rotor in its normal direction. The leaf spring is so designed as to be flexed to allow the rotation of the rotor in its normal direction, and therefore the leaf spring needs to be pressed against the first gear. This gives rise to wear and an undesirable load on the motor. Another problem is that if the force under which the leaf spring is held against the first gear is low, the leaf spring may fail to properly prevent the reverse rotation of the rotor.

SUMMARY OF THE INVENTION

It is therefore an object of this invention to provide a device for limiting the direction of rotation of a synchronous motor which is simple in construction and yet can positively prevent the rotation of the motor in a reverse direction without resort to a frictional force, a viscous force or a resilient force.

According to the present invention, there is provided a device for limiting the direction of rotation of a synchronous motor comprising:

(a) a gear drivingly rotated by a rotor of the motor for being rotated;

(b) a shaft supported to a casing for rotatably supporting the gear in such a manner that the gear is movable in an axial direction of the shaft;

(c) a pair of fixed members fixed to the casing and supporting the shaft, the gear being interposed between the pair of fixed members, one of the fixed members having a first engaging portion on a surface thereof facing the gear; and (d) a first projection integrally formed on a surface of the gear facing the one fixed member, the projection being engageable with the engaging portion when the gear is rotated;

(e) the projection being engageable with said engaging portion to move the gear in the axial direction of the shaft to allow the rotation of the gear when the rotor is rotated in a normal direction, the projection being brought into abutting engagement with the engaging portion to prevent the rotation of the gear when the rotor is rotated in a reverse direction.

With this construction, when the rotor of the synchronous motor is rotated in a reverse direction at an initial stage of its rotation, the projection is brought into abutting engagement with the engaging portion to prevent the reverse rotation of the rotor. At this time, the reaction or rebound resulting from this abutting engagement causes the gear to rotate in the opposite direction so that the rotor is caused to rotate in its normal direction. On the other hand, when the rotor is rotated in its normal direction at an initial stage of its rotation, the rotor is allowed to rotate in this direction.

DESCRIPTION OF THE PREFERRED EMBODIMENTS OF THE INVENTION

Figure 1:
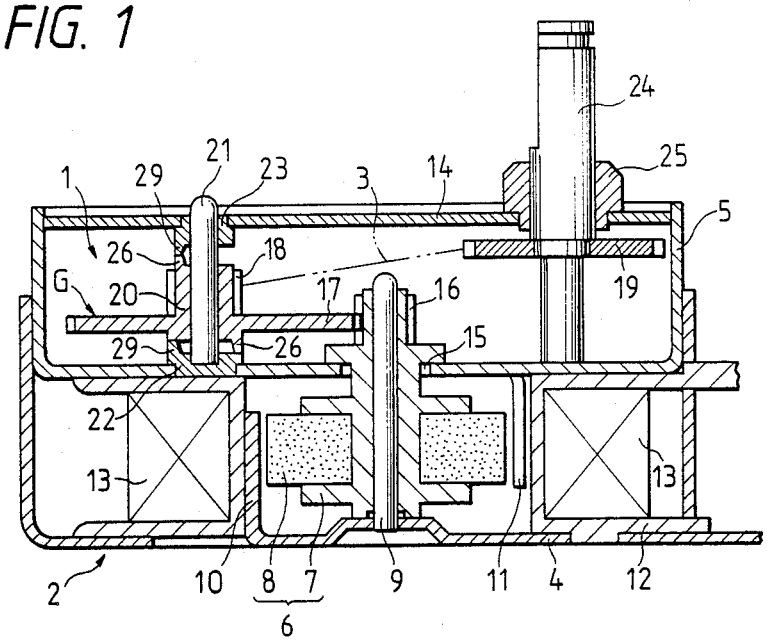
FIG. 1 is a vertical cross-sectional view of a synchronous motor incorporating a rotational direction-limiting device according to the present invention.

FIG. 1 shows a small synchronous motor 2 incorporating a a device 1 for limiting the direction of rotation of the motor 2. The rotational direction-limiting device 1 is incorporated in a gear train 3 transmitting a rotation of a rotor 6 of the motor 2 to its output shaft 24.

The small synchronous motor 2 comprises cup-shaped casings 4 and 5 constituting a housing for the motor 2, the casings 4 and 4 also serving as yokes as later described. The rotor 6 of the motor 2 comprises a hollow shaft 7, and an annular rotor magnet 8 mounted on the hollow shaft 7 and magnetized in its circumferential direction. The hollow shaft 7 is rotatably fitted on a fixed shaft 9 fixedly secured at one end to the center of the casing 4, so that the hollow shaft 7 can rotate together with the rotor magnet 8. The casings 4 and 5 have stamped-out portions 10 and 11 which are alternately disposed in surrounding relation to the outer periphery of the rotor magnet 8, the stamped-out portions 10 and 11 serving as magnetic poles constituting a stator. A coil bobbin 12 around which an exciting coil 13 is wound is mounted in the casing 4 in surrounding relation of the magnetic poles 10 and 11, the coil bobbin 12 being interposed between the bottoms of the casings 4 and 5.

A lid 14 is fixedly mounted on an open top of the casing 5 to close it. The rotational direction-limiting device 1 and the gear train 3 is contained in the casing 5. The hollow shaft 7 extends into the casing 5 through a center hole 15 formed through the bottom thereof, and the distal end of the hollow shaft 7 is formed into an output gear (rotor gear) 16.

A gear wheel G of a one-piece molded construction has a central boss 20 having an axial central bore therethrough, and a gear 17 of a greater diameter integrally formed around the boss 20 in concentric relation thereto, the outer periphery of the boss 20 being formed into a gear 18 of a smaller diameter. The rotor gear 16 is in mesh with the greater-diameter gear 17 which is a first gear of the gear train 3. The gear wheel G is molded of a suitable synthetic resin. The gear wheel G is rotatably mounted on a shaft 21 which extends through the central bore of the boss 20, the shaft 21 being supported at opposite ends by upper and lower fixed or stationary members 23 and 22 fixedly secured to the lid 14 and the bottom of the casing 5, respectively. The fixed members 22 and 23 also serve as bearings. The smaller-diameter gear 18 is in mesh with one of gears (not shown) of the gear train 3 so as to transmit the rotation to a gear 19 on the output shaft 24 through the gear train 3. The output shaft 24 is rotatably supported on the lid 14 through a bearing 25.

Figure 2:
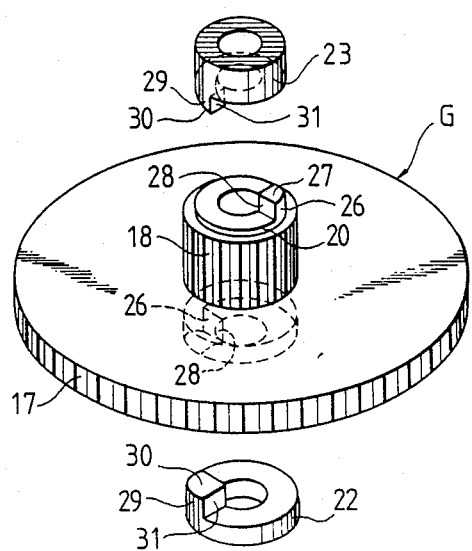
FIG. 2 is an enlarged exploded perspective view of an important portion of the device.
Figure 3A:
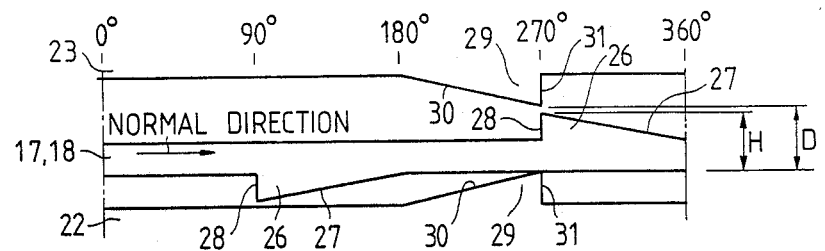
FIGS. 3(A) and 3(B) are developed views showing the operation of the device.

The rotational direction-limiting device 1 is constituted by the boss 20 of the gear wheel G and the upper and lower fixed members 23 and 22. More specifically, at least one projection 26 is formed on the end face of the boss 20 disposed perpendicular to the axis of the boss 20. Here, for example, two projections 26 and 26 are formed integrally on the opposite annular end faces of the boss 20 disposed in opposed relation to the upper and lower fixed members 23 and 22, respectively, as shown in FIGS. 1, 2 and 3. The upper and lower projections 26 and 26 are diametrically opposite with respect to the axis of the boss 20, that is, disposed 180° out of phase in terms of an angle of rotation. The end face 27 of each projection 26 disposed in opposed relation to the fixed member 22 (23) is gradually slanting in a normal direction of rotation of the gear wheel G, the gear wheel G being rotated in its normal direction when the rotor 6 is rotated in its normal direction. The projection 26 has at its trailing end an impinging surface 28 disposed perpendicular to the plane of the end face of the boss 20, the impinging surface 28 and the slanting surface 27 intersecting each other to define an edge of the projection 26. Each of the fixed members 22 and 23 has an integral engaging portion or projection 29 formed on its annular end face disposed in opposed relation to a respective one of the opposite annular end faces of the boss 20. The engaging portions 29 and 29 of the fixed members 22 and 23 are disposed in alignment with each other, that is, disposed in phase in terms of an angle of rotation. Each of the engaging portions 29 has an end face 30 which faces the end face of the boss 20 and is gradually slanting in the reverse direction of rotation of the gear wheel G, the slanting surface 30 having substantially the same gradient as that of the slanting surface 27 of the projection 26. The engaging portion 29 also has an abutment surface 31 disposed perpendicular to the end face of the fixed member 22 (23), the abutment surface 31 being directed in the normal direction of rotation of the gear wheel G. The slanting surface 30 and the abutment surface 31 intersect each other to define an edge of the engaging portion 29. The distance H between the apex of the projection 26 on one end face of the boss 20 and the other end face thereof is smaller than the distance D between the two engaging portions 29 and 29, as shown in FIG. 3(A).

The operation of the rotational direction-limiting device 1 will now be described.

When the exciting coil 13 is connected to an AC power source and is excited, the rotor 6 starts to rotate in either of the normal and reverse directions in synchronism with a rotating magnetic field produced by the exciting coil 13. At this initial stage of the rotation, if the rotor 6 rotates in its normal direction, it is not necessary to limit and change the direction of its rotation, so that the rotational direction-limiting device 1 does not operate. More specifically, referring to FIG. 3(A), when the gears 17 and 18 (i.e., the gear wheel G) move in the normal direction (i.e., in a right-hand direction), the lower projection 26 on the boss 20 is brought into sliding contact with the slanting surface 30 of the engaging portion 29 of the lower fixed member 22, so that the gear wheel G (and hence the gears 17 and 18) is moved upwardly along the shaft 21. Thus, the lower projection 26 passes past the engaging portion 29 of the lower fixed member 22. Then, the upper projection 26 is brought into contact with the engaging portion 29 on the upper fixed member 23, so that the gear wheel G is moved downwardly along the shaft 21. In this manner, the gear wheel G is moved upwardly and downwardly along the shaft 21 while it is rotated. As a result, the rotation of the rotor 6 is transmitted to the output shaft 24 through the rotor gear 16, the gears 17 and 18 of the gear train 3, those gears of the gear train 3 interposed between the gear 18 and the gear 19, and the gear 19, so that the output shaft 24 is rotated in its normal direction.

Figure 3B:
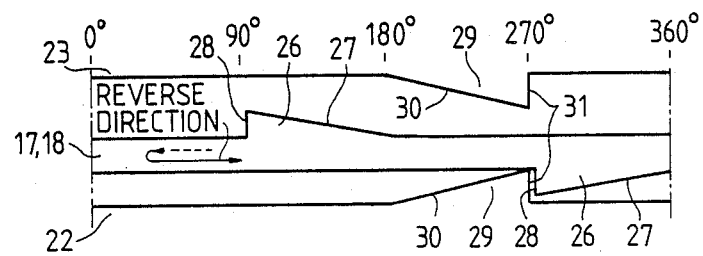

In contrast, if the rotor 6 rotates in its reverse direction at the initial stage of its rotation, the rotational direction-limiting device 1 limits such reverse rotation of the rotor 6 and causes it to rotate in the normal direction before the gear wheel G (and hence the gears 17 and 18) makes one rotation. More specifically, as shown in FIG. 3(B), the impinging surface 28 of the lower projection 26 is brought into striking or abutting engagement with the abutment surface 31 of the lower engaging portion 29, so that a further reserve rotation of the rotor 6 is prevented. At this time, since the impinging surface 28 impinges on the abutment surface 31 with an impact, the reaction force or rebound resulting therefrom is transmitted to the rotor 6 through the gear 17 and the rotor gear 16 so that the rotor 6 is caused to rotate in its normal direction.

If the rotational direction-limiting device 1 illustrated in FIG. 1 is incorporated into the small synchronous motor 2 upside down, the impinging surface 28 of the upper projection 26 (FIG. 3) is brought into striking engagement with the abutment surface 31 of the upper engaging portion 29 when the rotor 6 is rotated in its reverse direction. Also, if the device 1 is incorporated into the motor 2 with the shaft 21 disposed horizontally, the impinging surface 28 of either of the upper and lower projections 26 (FIG. 3) is brought into striking engagement with its mating abutment surface 31, depending on the position of the gear wheel G.

The upper and lower engaging portions 29 and 29 may be disposed 180° out of phase, in which case the upper and lower projections 26 and 26 are disposed in phase.

Figure 4:
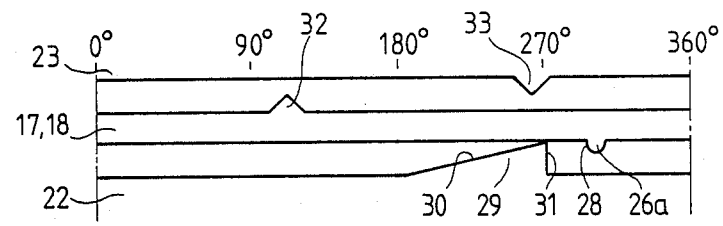
FIGS. 4 and 5 are views similar to FIG. 3(A) but showing modified devices.
Figure 5:
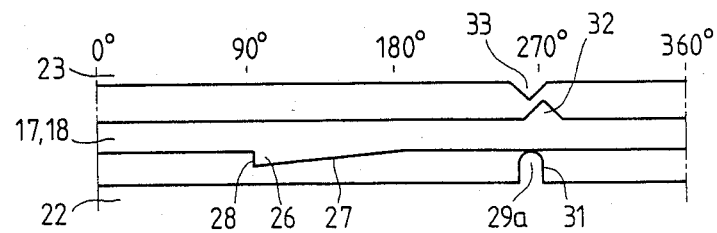

In the above-described embodiment the two projections 26 and 26 each having the impinging surface 28 are formed on the opposite end faces of the boss 20, only one projection 26a (26) and only one projection 29 (29a) may be provided as shown in FIGS. 4 and 5. Also, the projection 26a (FIG. 4) and the engaging portion 29a (FIG. 5) may have a distal end of a semi-spherical shape, and it will suffice that the slanting surface 30 (27) is formed on either of the engaging portion 29 (FIG. 4 and the projection 26 (FIG. 5). Protuberances 32 and 33 of a triangular cross-section are formed respectively on the opposed faces of the boss 20 and the upper fixed member 23. The gear wheel G raised by the engaging portion 29 (29a) is lowered mainly under the influence of gravity, and the protuberances 32 and 33 can slidingly contact each other when the gear wheel G is in its raised position, so as to assist in ensuring such downward movement of the gear wheel G.

Further, in the above embodiment, although the gear wheel G having the integral gears 17 and 18 is movable along the fixed shaft 21, the shaft 21 may be integral with the gear wheel G, in which case the shaft 21 is so arranged as to be axially movable relative to the upper and lower fixed members 23 and 22.

In the present invention, grease or a spring is not provided in the rotational direction-limiting device 1, and the device 1 does not depend on a friction torque for preventing the reverse rotation of the rotor 6. Therefore, the device 1 can positively prevent such reverse rotation. Another advantage is that a rotational torque required for the rotational direction-limiting operation is less, and therefore the motor 2 is not subjected to an unreasonable load, so that the motor can use the motor torque to a maximum level. Further, since the device 1 does not need a lever, grease, a spring and so on, the device 1 is simple in construction, and therefore the device 1 can be easily assembled without error.

What is claimed is:

1. A device for limiting the direction of rotation of a synchronous motor comprising:
    (a) a gear drivingly rotated by a rotor of the motor for being rotated;
    (b) a shaft supported to a casing for rotatable supporting said gear in such a manner that said gear is movable in an axial direction of said shaft;
    (c) a pair of fixed members fixed to a casing and supporting said shaft, said gear being interposed between said pair of fixed members, one of said fixed members having a first engaging portion on a surface thereof facing said gear; and
    (d) a first projection integrally formed on a surface of said gear facing said one fixed member, said projection being engageable with said engaging portion when said gear is rotated;
    (e) said projection being engageable with said engaging portion to move said gear in the axial direction of said shaft to allow the rotation of said gear when the rotor is rotated in a normal direction, said projection being brought into abutting engagement with said engaging portion to prevent the rotation of said gear when said rotor is rotated in a reverse direction.

2. A device according to claim 1, in which one of said projection and said engaging portion has a slanting guide surface for sliding contact with the other to move said gear along the axis of said shaft, one of said projection and said engaging portion having an abutment surface for abutment with the other to prevent the rotation of said gear.

3. A device according to claim 1, in which said gear and said projection are formed integrally with each other by molding.

4. A device according to claim 3, in which said gear has a central boss, said projection being formed on an end of said boss, said one fixed member and said engaging portion being formed integrally by molding.

5. A device according to claim 2, in which a second projection is integrally formed on a surface of said gear facing the other fixed member, the other fixed member having a second engaging portion on a surface thereof facing said gear, said second projection and said second engaging portion cooperating to move said gear along said shaft in a direction opposite to the movement of said gear caused by said first projection and said first engaging portion, and said first and second projections being spaced 180° from each other with respect to an angle of rotation of said gear.

6. A device according to claim 1, in which said shaft is fixedly secured to said pair of fixed members, said gear being movable relative to said shaft along the axis of said shaft.

7. A device according to claim 1, in which said shaft is formed integrally with said gear and is movable relative to said pair of fixed members along the axis of said shaft.

8. A device for limiting the direction of rotation of a synchronous motor comprising:
    (a) a rotor gear adapted to be mounted on a rotor of the motor;
    (b) a gear wheel of a one-piece construction having a greater-diameter gear in mesh with said rotor gear, and a smaller-diameter gear disposed coaxially with said greater-diameter gear and connectable to an output shaft of the motor;
    (c) a shaft rotatably supporting said gear wheel in such a manner that said gear wheel is movable along the axis of said shaft;
    (d) a pair of fixed members fixed to a casing and supporting said shaft, said gear wheel being interposed between said pair of fixed members, one of said fixed members having a first engaging portion on a surface thereof facing one of said greater-diameter gear and said smaller-diameter gear; and
    (e) a first projection integrally formed with one of said greater-diameter gear and said smaller-diameter gear and facing said surface of said one fixed member, said projection being engageable with said engaging portion when said gear wheel is rotated;
    (f) said projection being engageable with said engaging portion to move said gear wheel along the axis of said shaft to allow the rotation of said gear wheel when the rotor is rotated in a normal direction, said projection being brought into abutting engagement with said engaging portion to prevent the rotation of said gear wheel when said rotor is rotated in a reverse direction.

9. A device according to claim 8, in which said engaging portion and said projection project in the direction of the axis of said shaft.

10. A device according to claim 9, in which one of said projection and said engaging portion has a slanting guide surface for sliding contact with the other to move said gear wheel along the axis of said shaft, said slanting guide surface varying in gradient in the direction of the axis of said shaft, one of said projection and said engaging portion having an abutment surface for abutment with the other to prevent the rotation of said gear wheel, and said abutment surface extending along the axis of said shaft.

11. A device according to claim 10, in which a second projection is integrally formed on the other of said greater-diameter gear and said smaller-diameter gears facing said the other fixed member, the other fixed member having a second engaging portion on a surface thereof facing said other of said greater-diameter gear and said smaller-diameter gear, said second projection and said second engaging portion cooperating to move said gear wheel along said shaft in a direction opposite to the movement of said gear wheel caused by said first projection and said first engaging portion, and said first and second projections being disposed diametrically oppositely with respect to said shaft.

12. A device according to claim 10, in which said projection has said slanting guide surface and said abutment surface, said engaging portion having a distal end of a semi-spherical shape.

13. A device according to claim 10, in which said engaging portion has said slanting guide surface and said abutment surface, said engaging portion having a distal end of a semi-spherical shape.

* * * * *

UNITED STATES PATENT AND TRADEMARK OFFICE
CERTIFICATE OF CORRECTION

PATENT NO. : 4,893,038

DATED : JANUARY 9, 1990

INVENTOR(S) : Y. MIYAZAWA

It is certified that error appears in the above-identified patent and that said Letters Patent is hereby corrected as shown below:

Please change Date of Patent: from "Jan. 9, 1989" to --Jan. 9, 1990--.

Signed and Sealed this

Sixteenth Day of April, 1991

Attest:

HARRY F. MANBECK, JR.

Attesting Officer

Commissioner of Patents and Trademarks